(12) United States Patent
Murata et al.

(10) Patent No.: US 11,837,410 B2
(45) Date of Patent: Dec. 5, 2023

(54) DIELECTRIC CERAMIC COMPOSITION AND CERAMIC CAPACITOR

(71) Applicant: Murata Manufacturing Co., Ltd., Nagaokakyo (JP)

(72) Inventors: Tomoki Murata, Nagaokakyo (JP); Hirofumi Akamatsu, Fukuoka (JP); Fumiyasu Oba, Tokyo (JP); Akira Takahashi, Tokyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 247 days.

(21) Appl. No.: 17/498,430

(22) Filed: Oct. 11, 2021

(65) Prior Publication Data

US 2022/0028614 A1  Jan. 27, 2022

Related U.S. Application Data

(63) Continuation of application No. PCT/JP2020/010606, filed on Mar. 11, 2020.

(30) Foreign Application Priority Data

May 27, 2019 (JP) .................. 2019-098428

(51) Int. Cl.
 *H01G 4/12* (2006.01)
 *C04B 35/495* (2006.01)
 *H01G 4/30* (2006.01)

(52) U.S. Cl.
 CPC ......... *H01G 4/1254* (2013.01); *C04B 35/495* (2013.01); *H01G 4/30* (2013.01);
(Continued)

(58) Field of Classification Search
 CPC ...... H01G 4/1254; H01G 4/30; C04B 35/495; C04B 2235/3255; C04B 2235/3262; C04B 2235/765
 See application file for complete search history.

(56) References Cited

U.S. PATENT DOCUMENTS 8,841,224 B2  9/2014  Iguchi et al.
8,853,115 B2  10/2014  Iguchi et al.
(Continued)

FOREIGN PATENT DOCUMENTS

JP   2013180906 A   9/2013
JP   2013180907 A   9/2013
(Continued)

OTHER PUBLICATIONS

International Search Report issued in PCT/JP2020/010606, dated May 26, 2020.
(Continued)

*Primary Examiner* — Michael P McFadden
(74) *Attorney, Agent, or Firm* — ArentFox Schiff LLP

(57) ABSTRACT

A dielectric ceramic composition that contains an oxide of A, R, and B and an oxide of Mn. The A is at least one selected from the group consisting of K and Na. The R is at least one selected from the group consisting of La, Ce, Pr, Nd, Sm, Eu, Gd, Tb, Dy, Ho, Er, Tm, Yb, Lu, Y, and Sc. The B is at least one selected from the group consisting of Nb and Ta. The molar ratio of the A:R:B:Mn is $2-x:1+x/3:5+y:z$. The x, y, and z satisfy $-0.3 \leq x \leq 0.6$, $-0.5 \leq y \leq 0.5$, and $0.001 \leq z \leq 0.5$, respectively.

16 Claims, 1 Drawing Sheet

(52) U.S. Cl.
CPC ............. *C04B 2235/3255* (2013.01); *C04B 2235/3262* (2013.01); *C04B 2235/765* (2013.01)

(56) References Cited

U.S. PATENT DOCUMENTS

| | | | |
|---|---|---|---|
| 8,921,248 B2 | 12/2014 | Iguchi et al. | |
| 2004/0135504 A1* | 7/2004 | Tamaki | C09K 11/0883 313/512 |
| 2007/0138459 A1* | 6/2007 | Wong | C01G 25/006 977/811 |
| 2013/0088119 A1* | 4/2013 | Hayashi | H10N 30/097 252/62.9 R |
| 2013/0222969 A1* | 8/2013 | Iguchi | C04B 35/495 361/301.4 |
| 2013/0222970 A1 | 8/2013 | Iguchi et al. | |
| 2013/0222974 A1 | 8/2013 | Iguchi et al. | |
| 2017/0018701 A1* | 1/2017 | Ueda | H02N 2/163 |
| 2017/0372840 A1 | 12/2017 | Takahashi | |
| 2018/0040424 A1 | 2/2018 | Takahashi | |
| 2018/0123019 A1* | 5/2018 | Miura | C04B 35/6264 |
| 2020/0169191 A1* | 5/2020 | Kubota | H10N 30/8536 |
| 2021/0331937 A1* | 10/2021 | DuBois | C04B 35/62222 |

FOREIGN PATENT DOCUMENTS

| | | |
|---|---|---|
| JP | 2013180908 A | 9/2013 |
| JP | 2017178744 A | 10/2017 |
| JP | 2018002497 A | 1/2018 |
| JP | 2018020931 A | 2/2018 |
| JP | 2018104209 A | 7/2018 |
| JP | 2018135254 A | 8/2018 |

OTHER PUBLICATIONS

R. R. Neurgaonkar, et al.; "Ferroelectric and Structural Properties of the Tungusten Bronze System $K_2Ln_{3+}Nb_5O_{15}$, Ln=La to Lu"; Materials Research Bulletin, 1990, vol. 25, pp. 959-970.

* cited by examiner

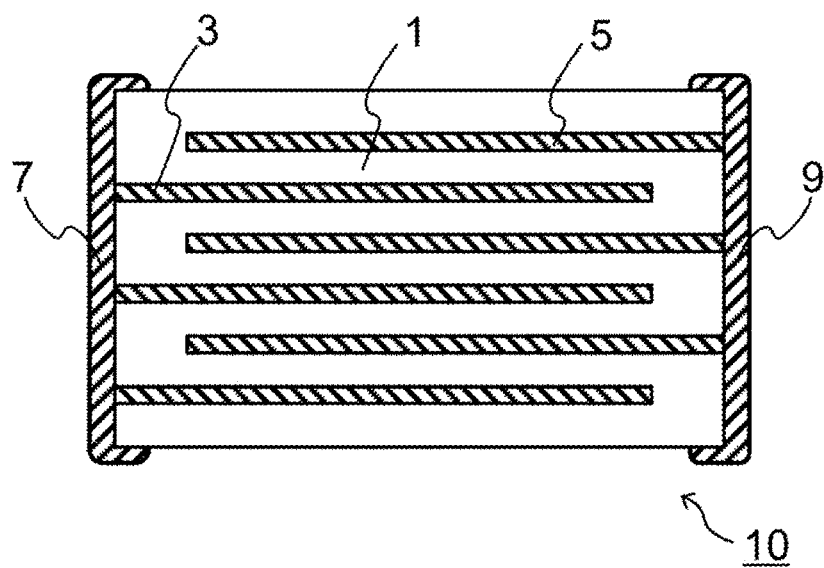

DIELECTRIC CERAMIC COMPOSITION AND CERAMIC CAPACITOR

CROSS REFERENCE TO RELATED APPLICATIONS

The present application is a continuation of International application No. PCT/JP2020/010606, filed Mar. 11, 2020, which claims priority to Japanese Patent Application No. 2019-098428, filed May 27, 2019, the entire contents of each of which are incorporated herein by reference.

FIELD OF THE INVENTION

The present invention relates to a dielectric ceramic composition and a ceramic capacitor.

BACKGROUND OF THE INVENTION

Thus far, ferroelectric ceramics such as barium titanate ($BaTiO_3$) have been generally used as materials of dielectric sections of ceramic capacitors.

In recent years, as applications of ceramic capacitors have expanded, various characteristics have been required. In order to respond to such a requirement, dielectric ceramic compositions having various compositions have been proposed as materials of dielectric sections of these ceramic capacitors. For example, those having a tetragonal tungsten bronze structure which is quite similar to a perovskite structure in crystal structure and which is different from a perovskite structure in polarization structure have been proposed as novel dielectric ceramic compositions (refer to Patent Documents 1 and 2 and the like).

Patent Document 1 discloses a dielectric ceramic composition containing a compound which is represented by the general formula $\{A_{1-x}(RE)_{2x/3}\}_y\text{-}D_2O_{5+y}$ and which has a tungsten bronze structure and an oxide of M, wherein the A is at least one selected from the group consisting of Ba, Ca, Sr, and Mg; the D is at least one selected from the group consisting of Nb and Ta; the RE is at least one selected from the group consisting of Sc, Y, La, Ce, Pr, Nd, Sm, Eu, Gd, Tb, Dy, Ho, Er, Tm, Yb, and Lu; the x and y satisfy the relations $0<x<1$ and $y>0$; and the M is at least one selected from the group consisting of Al, Si, B, and Li.

Patent Document 2 discloses a dielectric ceramic composition containing a major component having a tetragonal tungsten bronze structure represented by the general formula $A_3(B1)(B2)_4O_{15}$ and a minor component, wherein A is at least one selected from Ba, Sr, Ca, and a rare-earth element; B1 and B2 include Zr and Nb; the minor component is at least one selected from Mn, Cu, V, Fe, Co, and Si; supposing that the sum of B1 and B2 is 100 mol %, the sum of the contents of Mn, Cu, V, Fe, and Co are 0.5 mol % to less than 4 mol %, the content of Si is less than 7 mol %, the content of Ba is 9.8 mol % to 61.8 mol %, the content of Ca is less than 51.5 mol %, the content of Sr is less than 41.2 mol %, and the content of the rare-earth element is less than 30.9 mol %; the ratio of A to B1 and B2 is from 0.588 to 0.618; and supposing that the whole is 100 mol %, the content of Zr is greater than 8 mol % to less than 50 mol % and the content of Nb is 50 mol % to 80 mol %.

Patent Document 1: Japanese Unexamined Patent Application Publication No. 2013-180908
Patent Document 2: Japanese Unexamined Patent Application Publication No. 2018-104209
Non-Patent Document 1: R. R. Neurgaonkar, et al., "FEROELECTRIC AND STRUCTURAL PROPERTIES OF THE TUNGUSTEN BRONZE SYSTEM K2Ln3+Nb5O15, Ln=La to Lu", Materials Research Bulletin, 1990, Vol. 25, pp. 959-970

SUMMARY OF THE INVENTION

Barium titanate, which has a perovskite structure, has a problem in that applying a direct-current voltage thereto reduces relative dielectric constant because of ferroelectricity. In contrast, in the dielectric ceramic compositions which have the tetragonal tungsten bronze structure and which are described in Patent Documents 1 and 2, a decrease in the relative dielectric constant under a direct-current voltage can be reduced by suppressing the ferroelectricity. However, in the dielectric ceramic compositions described in Patent Documents 1 and 2, an improvement in the relative dielectric constant under a direct-current voltage has not been achieved. If a dielectric ceramic composition in which the relative dielectric constant improves under a direct-current voltage can be achieved, this achievement probably contributes to the expansion of applications of ceramic capacitors and the enhancement of electric characteristics.

In addition, $K_2Ln^{3+}Nb^5O^{15}$ (Ln=La to Lu), which does not relate to a ceramic capacitor, has been reported as a substance having a tetragonal tungsten bronze structure (Non-Patent Document 1). Non-Patent Document 1 discloses that a substance having such a composition exhibits a low relative dielectric constant and low resistivity. The substance described in Non-Patent Document 1 is difficult to be used as a dielectric under a direct-current voltage because the resistivity is low, and is not suitable for use as material of a dielectric section of a ceramic capacitor because the relative dielectric constant is low.

It is an object of the present invention to provide a novel dielectric ceramic composition which has a high relative dielectric constant and high resistivity and in which the relative dielectric constant improves under a direct-current voltage. It is another object of the present invention to provide a ceramic capacitor containing the dielectric ceramic composition.

According to an aspect of the present invention, a dielectric ceramic composition containing an oxide of A, R, and B and an oxide of Mn is provided. The A is at least one selected from the group consisting of K and Na. The R is at least one selected from the group consisting of La, Ce, Pr, Nd, Sm, Eu, Gd, Tb, Dy, Ho, Er, Tm, Yb, Lu, Y, and Sc. The B is at least one selected from the group consisting of Nb and Ta. The molar ratio of the A:R:B:Mn is 2−x:1+x/3:5+y:z. The x, y, and z satisfy $-0.3 \leq X \leq 0.6$, $-0.5 \leq y \leq 0.5$, and $0.001 \leq z \leq 0.5$, respectively.

According to another aspect of the present invention, a ceramic capacitor including two electrodes and a dielectric section located between the two electrodes is provided. The dielectric section is made from the dielectric ceramic composition of the present invention.

According to the present invention, a novel dielectric ceramic composition which has a high relative dielectric constant and high resistivity and in which the relative dielectric constant improves under a direct-current voltage is provided. Furthermore, according to the present invention, a ceramic capacitor containing the dielectric ceramic composition is provided.

BRIEF DESCRIPTION OF THE DRAWING

The FIGURE is a schematic sectional view of a ceramic capacitor according to an embodiment of the present invention.

DETAILED DESCRIPTION OF THE PREFERRED EMBODIMENTS

Embodiments of the present invention are described below in detail. The present invention is not limited to the embodiments and various modifications can be made.

(Dielectric Ceramic Composition)

A dielectric ceramic composition (also simply referred to herein as a "(ferro)dielectric ceramic") according to an embodiment contains an oxide of A, R, and B and an oxide of Mn.

Herein, A is at least one selected from the group consisting of K and Na; R is at least one selected from the group consisting of La, Ce, Pr, Nd, Sm, Eu, Gd, Tb, Dy, Ho, Er, Tm, Yb, Lu, Y, and Sc; B is at least one selected from the group consisting of Nb and Ta; the molar ratio (or atomic ratio) of A:R:B:Mn is 2−x:1+x/3:5+y:z; and x, y, and z satisfy −0.3≤x≤0.6, −0.5≤y≤0.5, and 0.001≤z≤0.5, respectively.

Studies by the inventors have revealed that, when A, R, and B are limited and the molar ratio of A:R:B:Mn is limited as described above in a composition containing an oxide of A, R, and B and an oxide of Mn, a high relative dielectric constant and high resistivity are obtained and the relative dielectric constant improves under a direct-current voltage.

More specifically, although it is not intended to limit the present invention, the dielectric magnetism composition containing the oxide of A, R, and B, and the oxide of Mn is a dielectric magnetism composition which has a tetragonal tungsten bronze structure made of the oxide of A, R, and B and which contains the oxide of Mn. Studies by the inventors have revealed that, when A, R, and B forming the structure are limited, Mn is added, and the molar ratio of A:R:B:Mn is limited as described above in a composition having a tetragonal tungsten bronze structure, a high relative dielectric constant and high resistivity are obtained and the relative dielectric constant improves under a direct-current voltage.

Herein, the "tetragonal tungsten bronze structure" described in the present specification is based on a crystal structure represented by the general formula $A_6B_{10}O_{30}$ (thus, also represented by $A_3B_5O_{15}$) (refer to, for example, Non-Patent Document 1) and has a tetragonal crystal structure in a certain temperature zone. In another temperature zone, however, the "tetragonal tungsten bronze structure" described in the present specification is not limited to a tetragonal crystal structure, and may have another crystal structure including an orthorhombic crystal structure, a rhombic crystal structure, and a monoclinic crystal structure in association with the displacement of the position of each atom. Various site defects including A-sites and B-sites, interstitial sites, and site substitutional solid solutions can be introduced into the tetragonal tungsten bronze structure. Structures into which these have been introduced are collectively referred to as the tetragonal tungsten bronze structure. Specifically, with reference to the general formula $A_6B_{10}O_{30}$, which is fundamental, for the six A-sites, one lacking none of the A-sites is referred to as a filled type, one lacking only one of the A-sites is referred to as an unfilled type, one lacking only 1.33 of the A-sites is referred to as an empty type, and these are included in the tetragonal tungsten bronze structure.

The fact that the dielectric ceramic composition contains the oxide of A, R, and B and the oxide of Mn and the molar ratio of A:R:B:Mn can be confirmed and determined by any appropriate element analysis. The fact that the dielectric ceramic composition has the tetragonal tungsten bronze structure made of the oxide of A, R, and B can be confirmed by X-ray diffraction (XRD) analysis or the like.

The oxide of A, R, and B (or the tetragonal tungsten bronze structure) can be typically represented by the general formula $A_{2-x}R_{1+x/3}B_{5+y}O_{15+\delta}$ (where A, R, B, x, and y are as described above). Although it is not intended to limit the present embodiment, in this case, B may be located at a B-site of the tetragonal tungsten bronze structure, A may be located at an A-site of the tetragonal tungsten bronze structure, and R may be located at an A-site of the tetragonal tungsten bronze structure (in such a state that A is substituted by R and R forms a solid solution). The molar ratio in the dielectric ceramic composition can be determined on the basis of the amount (corresponding to "5+y") of B. Herein, it is difficult to identify the amount (molar ratio) of oxygen, O, that is, "15+δ" by analysis; δ can take any value depending on the oxidation state or defective state of a substance; and the value of δ does not affect an effect of the present invention. Although it is not intended to limit the present invention, illustratively, δ may satisfy −7.5≤δ≤15.

R is a rare-earth element. R preferably includes La and another element other than La (that is, another element that is at least one element selected from the group consisting of Ce, Pr, Nd, Sm, Eu, Gd, Tb, Dy, Ho, Er, Tm, Yb, Lu, Y, and Sc). This enables the relative dielectric constant to significantly improve under a direct-current voltage. Although the present invention is not restricted to any theory, combining La, which has a large ionic radius, with another element other than La appropriately adjusts a polarization structure (modulates a polarization network) and probably enables a large effect to be obtained.

In this case, the mole fraction (or atom fraction) of La in R may be appropriately selected and is preferably 0.1 to 0.9.

More specifically, R more preferably includes La and Pr. R may include La and Pr only or may further include at least one element in addition to La and Pr.

The dielectric ceramic composition according to this embodiment contains the oxide of A, R, and B and the oxide of Mn and typically may substantially be made of these oxides. However, the dielectric ceramic composition according to this embodiment may contain another trace substance, for example, a trace element which may be inevitably contained. Furthermore, as long as the dielectric composition according to this embodiment contains the oxide of A, R, and B as a first essential component and the oxide of Mn as a second essential component such that the molar ratio of A:R:B:Mn satisfies a predetermined range, the dielectric composition according to this embodiment may contain any appropriate third component (in a relatively small amount with respect to the sum of the amounts of the first and second essential components) depending on applications required for the dielectric magnetism composition in some cases.

The dielectric ceramic composition according to this embodiment can be produced by any appropriate method and can be produced, for example, as described below.

The dielectric ceramic composition according to this embodiment may be obtained in such a manner that a major component composition made of the oxide of A, R, and B is obtained and the oxide of Mn is introduced as a minor component into the major component composition. The major component composition can be prepared by any appropriate method which may be a solid phase method, a wet method, or a vapor phase method. The solid phase method is a method in which at least one selected from the group consisting of oxides of elements, hydroxides thereof, carbonates thereof, and other compounds is used as an element source of each of A, R, and B; a mixture of powders of the element sources is calcined; and the oxide of A, R, and B is obtained by a solid phase reaction and the major component composition may be in the form of a calcined raw material powder. Examples of the wet method include a coprecipitation method, a hydrothermal method, an oxalic acid method, and the like. The vapor phase method is, for example, a method in which high-frequency plasma is used. The major component composition may have the tetragonal tungsten bronze structure made of the oxide of A, R, and B. This is, however, not essential for this embodiment as long as the tetragonal tungsten bronze structure made of the oxide of A, R, and B is obtained in the dielectric ceramic composition which is finally obtained. The oxide of Mn can be introduced into the major component composition by any appropriate method. The dielectric ceramic composition into which the oxide of Mn has been introduced may be obtained in such a manner that, for example, at least one selected from the group consisting of the oxide of Mn, a hydroxide thereof, a carbonate thereof, and other compounds is used as an element source of Mn; a powder of the element source of Mn is added to the major component composition; and a Mn-mixed raw material composition thereby obtained is heat-treated. The element sources of A, R, B, and Mn used may be weighed depending on the molar ratio required for the dielectric ceramic composition which is finally obtained. The amount of Mn (minor component) contained in the dielectric ceramic composition is smaller than the amount of A, R, and B (major components) and therefore probably does not substantially affect the tetragonal tungsten bronze structure made of the oxide of A, R, and B.

The dielectric ceramic composition according to this embodiment has a high relative dielectric constant and high resistivity. Although it is not intended to limit the present embodiment, the relative dielectric constant ε (−) may be, for example, 400 or more (no direct-current voltage applied) and the resistivity ρ (Ωcm) may be, for example, $10^{10}$ Ωcm or more (that is, log 10 or more) at room temperature (10° C. to 30° C., typically 25° C.). The dielectric ceramic composition according to this embodiment can be successfully used as material of a dielectric section of a ceramic capacitor.

Furthermore, in the dielectric ceramic composition according to this embodiment, the relative dielectric constant improves under a direct-current voltage. More specifically, in a case where a direct-current voltage is applied, a higher relative dielectric constant is obtained as compared to the relative dielectric constant in a case where no direct-current voltage is applied. Although it is not intended to limit the present embodiment, the relative dielectric constant ε (−) in a case where no direct-current voltage is applied at room temperature and the relative dielectric constant $\varepsilon_{DC}$ (−) in a case where a direct-current voltage of 330 V is applied at room temperature are measured and the rate of change in relative dielectric constant $\Delta\varepsilon_{DC}$ (%) $(=(\varepsilon_{DC}-\varepsilon)/\varepsilon \times 100)$ calculated from these may be 0% or more and is preferably 10% or more. The dielectric ceramic composition according to this embodiment can successfully be used as material of a dielectric section of a ceramic capacitor for applications in which a high direct-current voltage is applied and can effectively reduce, for example, the power loss during the charge or discharge of a ceramic capacitor.

(Ceramic Capacitor)

A ceramic capacitor according to this embodiment includes two electrodes and a dielectric section located between the two electrodes. The dielectric section is made from the above-mentioned dielectric ceramic composition. In the ceramic capacitor, there may be at least two electrodes, and two electrodes or three or more electrodes are placed such that the dielectric section is located therebetween. The electrodes may include an inner electrode present in the dielectric section and an outer electrode which is present outside the dielectric section and which is (at least electrically) connected to a predetermined inner electrode. Material of the electrodes is not particularly limited and any appropriate conductive material can be used.

Typically, the ceramic capacitor according to this embodiment may be, for example, a multilayer ceramic capacitor 10 illustrated in the FIGURE. The multilayer ceramic capacitor 10 includes a dielectric section 1 formed from a dielectric ceramic composition, inner electrodes 3 and 5 which are embedded in the dielectric section 1 and which are alternately arranged, and outer electrodes 7 and 9 connected to the inner electrodes 3 and 5, repeatedly. In an illustrated example, the inner electrodes 3 and 5 are schematically illustrated three by three, and the number of the inner electrodes may be appropriately selected depending on specifications of the capacitor or the like.

The ceramic capacitor according to this embodiment can be manufactured by any appropriate method. The ceramic capacitor according to this embodiment may be manufactured in, for example, a method for producing a known ceramic capacitor by using, as a ceramic raw material, the Mn-mixed raw material composition described above in relation to a method for producing the dielectric ceramic composition, but is not limited to this.

The ceramic capacitor according to this embodiment can provide an effect similar to that of the dielectric ceramic composition according to the above-mentioned embodiment, has a high relative dielectric constant and high resistivity, and has a relative dielectric constant improved under a direct-current voltage.

EXAMPLES

Sample Numbers 1 to 47

Dielectric ceramic compositions which contained an oxide of A, R, and B and an oxide of Mn (dielectric ceramic compositions which had a tetragonal tungsten bronze structure made of the oxide of A, R, and B and which contained the oxide of Mn) and which had various different molar ratios between A, R, B, and Mn as shown by Sample Numbers 1 to 47 in Tables 1 and 2 were obtained by a procedure below. More specifically, ceramic capacitors each including two electrodes and a dielectric section located between the two electrodes, the dielectric section being formed from the dielectric ceramic compositions having various different molar ratios between A, R, B, and Mn as described above, were prepared. Among Sample Numbers 1 to 47 in Tables 1 and 2, those corresponding to comparative examples of the present invention are given the symbol "*". Samples other than the above correspond to examples of the present invention.

First, $K_2CO_3$, $Na_2CO_3$, $La_2O_3$, $Pr_6O_{11}$, $Nd(OH)_3$, $Sm_2O_3$, $Eu_2O_3$, $Gd_2O_3$, $Tb_2O_3$, $Dy_2O_3$, $Ho_2O_3$, $Er_2O_3$, $Nb_2O_5$, and $Ta_2O_5$ were used as element sources of the A, R, and B. These element sources were weighed so as to correspond to the molar ratio between elements, A, R, and B, as shown in Tables 1 and 2. These element sources were wet-mixed with PSZ (partially stabilized zirconia) balls with a nominal diameter of 2 mm, pure water, a dispersant, and an antifoaming agent using a ball mill. Slurries thereby obtained were dried and were granulated, followed by calcination at 1,000° C. to 1,200° C. in air, whereby calcined raw material powders having the tetragonal tungsten bronze structure made of the oxide of A, R, and B were synthesized as major component compositions.

$MnCO_3$ was used as an element source of Mn. $MnCO_3$ was weighed and was added to the calcined raw material powders so as to correspond to the molar ratio of Mn to each element, A, R, or B as shown in Tables 1 and 2, whereby Mn-mixed raw material compositions were obtained.

A polyvinyl butyral binder, a plasticizer, ethanol, and toluene were added to the Mn-mixed raw material compositions, followed by wet mixing together with PSZ balls using a ball mill, whereby sheet-forming ceramic slurries were prepared. Each of the sheet-forming ceramic slurries was formed into sheets with a thickness of 20 μm by a doctor blade method, whereby rectangular ceramic green sheets were obtained. Furthermore, a conductive paste containing a Pt powder as a conductive component was applied to the ceramic green sheets by screen printing so as to form a predetermined pattern, whereby precursor layers of inner electrodes were formed.

A predetermined number of the ceramic green sheets provided with the conductive paste (the precursor layers of the inner electrodes), which contained the Pt powder as a conductive component, were stacked such that sides on which the conductive paste reached a sheet end portion (extended to an outer portion) were alternated, followed by covering the ceramic green sheet on which the conductive paste was exposed with a ceramic green sheet provided with no conductive paste, whereby a stack was obtained. Precursor layers of outer electrodes were formed in such a manner that the conductive paste, which contained the Pt powder as a conductive component, was applied to both end surfaces of the stack that the conductive paste (the precursor layers of the inner electrodes) was exposed, followed by degreasing the stack by heating at 500° C. in air. The degreased stack was held at 1,250° C. to 1,350° C. for 120 minutes in air, whereby a ceramic containing the oxide of Mn was densified and the inner electrodes and the outer electrodes were formed from the conductive paste.

As a result, a multilayer ceramic capacitor 10 including a dielectric section 1 formed from a dielectric ceramic composition; inner electrodes 3 and 5 which were embedded in the dielectric section 1 and which were alternately arranged; and outer electrodes 7 and 9 connected to the inner electrodes 3 and 5, respectively, to be prepared as schematically illustrated in the FIGURE. Outside dimensions of the obtained multilayer ceramic capacitor were a width of 2.7 mm, a length of 3.6 mm, and a thickness of 0.56 mm. The number of the inner electrodes was two. The thickness of a dielectric layer interposed between the neighboring inner electrodes was 48 μm. The thickness of each of the inner electrodes was 1 μm. The counter electrode area of the neighboring inner electrodes was 3.2 $mm^2$.

Prepared multilayer ceramic capacitors of Sample Numbers 1 to 47 were dissolved and were subjected to ICP analysis, resulting in molar ratios as shown in Tables 1 and 2 except Pt, which was a major component of inner and outer electrodes. The XRD analysis (structural analysis) of the multilayer ceramic capacitors of Sample Numbers 1 to 47 showed that all the multilayer ceramic capacitors had a tetragonal tungsten bronze structure with no heterophase.

A direct-current voltage of 480 V was applied to the prepared multilayer ceramic capacitors of Sample Numbers 1 to 47 at room temperature, the leakage current was measured using a microammeter, and the resistivity ρ (Ωcm) was determined. Samples that the resistivity ρ (Ωcm) was log 10 or more were determined to be acceptable and samples that the resistivity ρ (Ωcm) was less than log 10 were determined to be unacceptable. Electrostatic capacity was measured for the multilayer ceramic capacitors by using an LCR meter at room temperature under conditions including a measurement frequency of 1 kHz and a measurement voltage of 1 Vrms without applying a direct-current voltage, followed by determining the relative dielectric constant ε (−). Samples that the relative dielectric constant ε was 400 or more were determined to be acceptable and samples that the relative dielectric constant s was less than 400 were determined to be unacceptable. Furthermore, electrostatic capacity was measured for the multilayer ceramic capacitors by using the LCR meter in combination with an external power supply at room temperature under conditions including a measurement frequency of 1 kHz and a measurement voltage of 1 Vrms with a direct-current voltage of 330 V applied to the multilayer ceramic capacitors, followed by determining the relative dielectric constant $\varepsilon_{DC}$ (−) The rate of change in relative dielectric constant $\Delta\varepsilon_{DC}$ (%) $(=(\varepsilon_{DC}-\varepsilon)/\varepsilon \times 100)$ was calculated based on the relative dielectric constant ε (−) Samples that the rate of change in relative dielectric constant $\Delta\varepsilon_{DC}$ (%) was positive were determined to be acceptable and samples that the rate of change in relative dielectric constant $\Delta\varepsilon_{DC}$ (%) was negative were determined to be unacceptable. When the relative dielectric constant $\varepsilon_{DC}$ could not be measured, the rate of change in relative dielectric constant $\Delta\varepsilon_{DC}$ was "unmeasurable". As comprehensive determination, samples that at least one of these determinations was unacceptable were determined to be "NG", samples that all these determinations were acceptable were determined to be "G", and samples that were determined to be "G" and that the rate of change in relative dielectric constant $\Delta\varepsilon_{DC}$ (%) was 10% or more were determined to be particularly excellent "G+". Results are collectively shown in Tables 1 and 2.

Reference Example: $BaTiO_3$

A multilayer ceramic capacitor was prepared in substantially the same manner as above except that $BaTiO_3$ was used instead of the Mn-mixed raw material compositions. Relative dielectric constant ε and the rate of change in relative dielectric constant $\Delta\varepsilon_{DC}$ (%) were measured for the prepared multilayer ceramic capacitor in the same manner as above. As Sample Number "$BaTiO_3$", results are also shown in Table 1.

TABLE 1

| Sample number | Comprehensive determination | Molar ratio | | | | | | Log(ρ/Ωcm) | ε(—) | $\Delta\varepsilon_{DC}$ (%) |
| | | A | | R | B | | Mn | | | |
| | | K | Na | Pr | Nb | Ta | | | | |
|---|---|---|---|---|---|---|---|---|---|---|
| *$BaTiO_3$ | — | — | — | — | — | — | — | — | 2130 | −54 |
| *1 | NG | 2 | | 1 | 5 | | 0 | 8.2 | 320 | −5.5 |

TABLE 1-continued

| | | Molar ratio | | | | | | | | | |
|---|---|---|---|---|---|---|---|---|---|---|---|
| | | A | | R | B | | | | | | |
| Sample number | Comprehensive determination | K | Na | Pr | Nb | Ta | Mn | Log(ρ/Ωcm) | ε(—) | $\Delta\varepsilon_{DC}$ (%) |
| 2 | G | 2 | | 1 | 5 | | 0.001 | 10.5 | 423 | 2.3 |
| 3 | G | 2 | | 1 | 5 | | 0.005 | 10.9 | 432 | 3.3 |
| 4 | G | 2 | | 1 | 5 | | 0.05 | 11.2 | 623 | 4.2 |
| 5 | G | 2 | | 1 | 5 | | 0.025 | 12.2 | 675 | 6.3 |
| 6 | G | 2 | | 1 | 5 | | 0.1 | 11.7 | 543 | 4.2 |
| 7 | G | 2 | | 1 | 5 | | 0.5 | 10.4 | 432 | 2.1 |
| *8 | NG | 2 | | 1 | 5 | | 1 | 5.5 | 91 | Unmeasurable |
| 9 | G | 1.8 | 0.2 | 1 | 5 | | 0.025 | 11.5 | 543 | 5.1 |
| 10 | G | 1.5 | 0.5 | 1 | 5 | | 0.025 | 11.4 | 532 | 4.3 |
| 11 | G | 2 | | 1 | 4.5 | 0.5 | 0.025 | 11.3 | 602 | 5.6 |
| 12 | G | 2 | | 1 | 4 | 1 | 0.025 | 11.5 | 562 | 5.2 |
| *13 | NG | 2.6 | | 0.8 | 5 | | 0.025 | 10.9 | 850 | −10.8 |
| 14 | G | 2.3 | | 0.9 | 5 | | 0.025 | 10.7 | 730 | 2.3 |
| 15 | G | 1.4 | | 1.2 | 5 | | 0.025 | 11.1 | 610 | 6.5 |
| *16 | NG | 1.1 | | 1.3 | 5 | | 0.025 | 8.8 | 440 | −3.3 |
| *17 | NG | 2 | | 1 | 6 | | 0.025 | 6.5 | 320 | Unmeasurable |
| 18 | G | 2 | | 1 | 5.5 | | 0.025 | 11.2 | 450 | 3.3 |
| 19 | G | 2 | | 1 | 4.5 | | 0.025 | 10.8 | 430 | 2.3 |
| *20 | NG | 2 | | 1 | 4 | | 0.025 | 8.9 | 152 | −0.3 |

TABLE 2

| | | Molar ratio | | | | | | | | | | | | Log | ε | $\Delta\varepsilon_{DC}$ |
|---|---|---|---|---|---|---|---|---|---|---|---|---|---|---|---|---|
| | | A | R | | | | | | | | | B | | | | |
| Sample number | Comprehensive determination | K | La | Pr | Nd | Sm | Eu | Gd | Tb | Dy | Ho | Er | Nb | Mn | (ρ/Ωcm) | (—) | (%) |
| 21 | G | 2 | 1 | | | | | | | | | | 5 | 0.025 | 11.6 | 1420 | 1.2 |
| 22 | G | 2 | | | 1 | | | | | | | | 5 | 0.025 | 11.7 | 587 | 5.5 |
| 23 | G | 2 | | | | 1 | | | | | | | 5 | 0.025 | 12.1 | 550 | 4.3 |
| 24 | G | 2 | | | | | 1 | | | | | | 5 | 0.025 | 11.7 | 532 | 2.2 |
| 25 | G | 2 | | | | | | 1 | | | | | 5 | 0.025 | 11.6 | 512 | 3.3 |
| 26 | G+ | 2 | 0.75 | | 0.25 | | | | | | | | 5 | 0.025 | 12.2 | 891 | 12.2 |
| 27 | G+ | 2 | 0.75 | | | | | 0.25 | | | | | 5 | 0.025 | 12.4 | 924 | 10.5 |
| 28 | G+ | 2 | 0.75 | | | | | | | | | 0.25 | 5 | 0.025 | 11.7 | 849 | 10.8 |
| 29 | G+ | 2 | 0.5 | | | | | 0.5 | | | | | 5 | 0.025 | 11.7 | 781 | 11.3 |
| 30 | G+ | 2 | 0.25 | 0.75 | | | | | | | | | 5 | 0.025 | 12.3 | 682 | 21.5 |
| 31 | G+ | 2 | 0.25 | | 0.75 | | | | | | | | 5 | 0.025 | 12.2 | 627 | 14.5 |
| 32 | G+ | 2 | 0.25 | | | | | 0.75 | | | | | 5 | 0.025 | 11.6 | 531 | 12.8 |
| 33 | G | 2 | | 0.75 | 0.25 | | | | | | | | 5 | 0.025 | 11.6 | 451 | 7.7 |
| 34 | G | 2 | | 0.75 | | 0.25 | | | | | | | 5 | 0.025 | 11.5 | 446 | 6.8 |
| 35 | G | 2 | | 0.75 | | | 0.25 | | | | | | 5 | 0.025 | 11.8 | 482 | 6.5 |
| 36 | G | 2 | | 0.75 | | | | 0.25 | | | | | 5 | 0.025 | 11.7 | 478 | 5.4 |
| 37 | G | 2 | | 0.75 | | | | | 0.25 | | | | 5 | 0.025 | 11.8 | 441 | 5.5 |
| 38 | G | 2 | | 0.75 | | | | | | 0.25 | | | 5 | 0.025 | 11.5 | 420 | 2.3 |
| 39 | G | 2 | | 0.75 | | | | | | | 0.25 | | 5 | 0.025 | 11.7 | 415 | 2.2 |
| 40 | G | 2 | | 0.75 | | | | | | | | 0.25 | 5 | 0.025 | 11.6 | 398 | 1.5 |
| 41 | G | 2 | | 0.5 | 0.5 | | | | | | | | 5 | 0.025 | 11.6 | 552 | 6.6 |
| 42 | G | 2 | | 0.25 | 0.75 | | | | | | | | 5 | 0.025 | 12.3 | 502 | 4.3 |
| 43 | G | 2 | | 0.25 | | | | 0.75 | | | | | 5 | 0.025 | 11.7 | 421 | 2.5 |
| 44 | G | 2 | | | 0.25 | | | 0.75 | | | | | 5 | 0.025 | 11.9 | 415 | 2.2 |
| 45 | G+ | 2 | 0.9 | 0.1 | | | | | | | | | 5 | 0.025 | 11.9 | 870 | 11.1 |
| 46 | G+ | 2 | 0.2 | 0.4 | 0.4 | | | | | | | | 5 | 0.025 | 12.2 | 615 | 14.1 |
| 47 | G+ | 2 | 0.1 | 0.7 | 0.2 | | | | | | | | 5 | 0.025 | 11.6 | 642 | 13.2 |

Referring to Tables 1 and 2, among Sample Numbers 1 to 47, those corresponding to examples of the present invention (those given the symbol "*") were all comprehensively determined to be "G", had high resistivity ρ and a high relative dielectric constant ε, and showed a positive rate of change in relative dielectric constant $\Delta\varepsilon_{DC}$ under a direct-current voltage (that is, the relative dielectric constant improved under a direct-current voltage). In particular, as shown by Sample Numbers 26 to 32 and 45 to 47, using La in combination with another element other than La as an element of R enabled a larger rate of change in relative dielectric constant $\Delta\varepsilon_{DC}$ to be obtained under a direct-current voltage. This is probably because the polarization network of this crystal system was modulated, though the present invention is not restricted to any theory.

In contrast, among Sample Numbers 1 to 47, those corresponding to comparative examples of the present invention (those not given the symbol "*") were all comprehensively determined to be "NG". When the amount of Mn (corresponding to the z) was less than 0.001 with respect to the amount of B (Nb in Sample Number 1) that was 5 like Sample Number 1, the resistivity ρ was low, the relative dielectric constant ε was also low, and the rate of change in relative dielectric constant $\Delta\varepsilon_{DC}$ under a direct-current voltage was negative. On the other hand, when the amount of Mn (corresponding to the z) was 1 with respect to the amount of B (Nb in Sample Number 8) that was 5 like Sample Number 8, the resistivity ρ and the relative dielectric constant s were significantly reduced due to lattice defects, the relative dielectric constant $s_{DC}$ during the application of a direct-current voltage could not be measured, and the rate of change in relative dielectric constant $\Delta\varepsilon_{DC}$ was "unmeasurable". When the x was outside the range $-0.3 \leq x \leq 0.6$ as shown by Sample Numbers 13 and 16, the rate of change in relative dielectric constant $\Delta\varepsilon_{DC}$ was negative because a polarization structure varied. When the y was outside the range $-0.5 \leq y \leq 0.5$ as shown by Sample Numbers 17 and 20, the resistivity ρ was significantly reduced due to lattice defects.

A dielectric ceramic composition according to the present invention can be successfully used as, but is not limited to, material of a dielectric section of a ceramic capacitor. A ceramic capacitor according to the present invention can be used in, but is not limited to, various wide applications in which a direct-current voltage is applied.

REFERENCE SIGNS LIST

1 Dielectric section (dielectric layer)
3, 5 Inner electrodes
7, 9 Outer electrodes
10 Ceramic capacitor (multilayer ceramic capacitor)

The invention claimed is:

1. A dielectric ceramic composition comprising:
an oxide of A, R, and B; and
an oxide of Mn, wherein
the A is at least one selected from the group consisting of K and Na,
the R is at least one selected from the group consisting of La, Ce, Pr, Nd, Sm, Eu, Gd, Tb, Dy, Ho, Er, Tm, Yb, Lu, Y, and Sc,
the B is at least one selected from the group consisting of Nb and Ta,
a molar ratio of the A:R:B:Mn is 2−x:1+x/3:5+y:z,
$-0.3 \leq x \leq 0.6$,
$-0.5 \leq y \leq 0.5$, and
$0.001 \leq z \leq 0.5$.

2. The dielectric ceramic composition according to claim 1, wherein the oxide of A, R, and B is represented by $A_{2-x}R_{1+x/3}B_{5+y}O_{15+\delta}$.

3. The dielectric ceramic composition according to claim 1, wherein the R includes La and at least one other element selected from the group consisting of Ce, Pr, Nd, Sm, Eu, Gd, Tb, Dy, Ho, Er, Tm, Yb, Lu, Y, and Sc.

4. The dielectric ceramic composition according to claim 3, wherein a mole fraction of the La in the R is 0.1 to 0.9.

5. The dielectric ceramic composition according to claim 1, wherein the R includes the La and at least the Pr.

6. The dielectric ceramic composition according to claim 1, wherein the dielectric ceramic composition has a relative dielectric constant ε (−) of 400 or more at room temperature where no direct-current voltage is applied thereto.

7. The dielectric ceramic composition according to claim 6, wherein the dielectric ceramic composition has a resistivity ρ (Ωcm) of $10^{10}$ Ωcm or more at room temperature.

8. The dielectric ceramic composition according to claim 1, wherein the dielectric ceramic composition has a resistivity ρ (Ωcm) of $10^{10}$ Ωcm or more at room temperature.

9. A ceramic capacitor comprising:
at least two electrodes; and
a dielectric section located between the at least two electrodes, wherein the dielectric section is made from the dielectric ceramic composition according to claim 1.

10. The ceramic capacitor according to claim 9, wherein the oxide of A, R, and B is represented by $A_{2-x}R_{1+x/3}B_{5+y}O_{15+\delta}$.

11. The ceramic capacitor according to claim 9, wherein the R includes La and at least one other element selected from the group consisting of Ce, Pr, Nd, Sm, Eu, Gd, Tb, Dy, Ho, Er, Tm, Yb, Lu, Y, and Sc.

12. The ceramic capacitor according to claim 11, wherein a mole fraction of the La in the R is 0.1 to 0.9.

13. The ceramic capacitor according to claim 9, wherein the R includes the La and at least the Pr.

14. The ceramic capacitor according to claim 9, wherein the dielectric ceramic composition has a relative dielectric constant ε (−) of 400 or more at room temperature where no direct-current voltage is applied thereto.

15. The ceramic capacitor according to claim 14, wherein the dielectric ceramic composition has a resistivity ρ (Ωcm) of $10^{10}$ Ωcm or more at room temperature.

16. The ceramic capacitor according to claim 9, wherein the dielectric ceramic composition has a resistivity ρ (Ωcm) of $10^{10}$ Ωcm or more at room temperature.

* * * * *